(12) United States Patent
Gleason et al.

(10) Patent No.: US 9,654,689 B2
(45) Date of Patent: May 16, 2017

(54) METHOD AND APPARATUS FOR CAMERA ACTUATOR DRIVER MODE CONTROL SYNCHRONIZED WITH IMAGING SENSOR FRAME

(71) Applicant: Apple Inc., Cupertino, CA (US)

(72) Inventors: Jeffrey N. Gleason, San Francisco, CA (US); Chiajen Lee, Irvine, CA (US); Ryan J. Dunn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 14/463,446

(22) Filed: Aug. 19, 2014

(65) Prior Publication Data

US 2016/0057347 A1    Feb. 25, 2016

(51) Int. Cl.
*H04N 5/225* (2006.01)
*H04N 5/232* (2006.01)
*G03B 13/36* (2006.01)
*H04N 5/217* (2011.01)
*H04N 5/357* (2011.01)

(52) U.S. Cl.
CPC ......... *H04N 5/23245* (2013.01); *G03B 13/36* (2013.01); *H04N 5/217* (2013.01); *H04N 5/2254* (2013.01); *H04N 5/23241* (2013.01); *H04N 5/3577* (2013.01)

(58) Field of Classification Search
CPC .................................................. H04N 5/23241
USPC ........................................................ 348/372
See application file for complete search history.

(56) References Cited

U.S. PATENT DOCUMENTS

| 6,882,370 | B2 * | 4/2005 | Ishimoto ................ H04N 5/232 348/296 |
| 7,224,135 | B1 | 5/2007 | Menegoli et al. |
| 7,903,154 | B2 * | 3/2011 | Kawanami ......... H04N 5/23209 348/241 |
| 8,189,280 | B2 | 5/2012 | Ollila et al. |
| 8,724,016 | B2 | 5/2014 | Tsai |
| 8,724,255 | B1 | 5/2014 | Hong et al. |

(Continued)

FOREIGN PATENT DOCUMENTS

| JP | H10133246 | 5/1998 |
| WO | WO-2013046819 A1 | 4/2013 |

OTHER PUBLICATIONS

International Search Report and Written Opinion, dated Oct. 28, 2015, Application No. PCT/US2015/042520.

(Continued)

*Primary Examiner* — Anthony J Daniels
(74) *Attorney, Agent, or Firm* — Blakely, Sokoloff, Taylor & Zafman LLP (57) ABSTRACT

A sequence of digital images are produced using an imaging sensor circuit, wherein each of the digital images was a result of light capture by the imaging sensor circuit during a respective pixel integration phase followed by analog to digital conversion during a respective readout phase. A camera actuator is driven while producing the sequence of images, wherein during a part of every respective readout phase for the sequence of digital images the actuator is driven using a linear drive circuit, and wherein during a part of every respective pixel integration phase the actuator is driven using a switch mode drive circuit. Other embodiments are also described and claimed.

22 Claims, 4 Drawing Sheets

(56) References Cited

U.S. PATENT DOCUMENTS

| | | | |
|---|---|---|---|
| 2007/0001103 A1* | 1/2007 | LaBelle | H04N 5/23241 250/214 SW |
| 2011/0234887 A1* | 9/2011 | Shimohata | G03B 3/10 348/353 |
| 2012/0019680 A1 | 1/2012 | Shimada et al. | |
| 2014/0211078 A1* | 7/2014 | Watanabe | H04N 5/2257 348/351 |

OTHER PUBLICATIONS

International Preliminary Report on Patentability for PCT/US2015/042520 mailed Mar. 2, 2017, 8 pages.

* cited by examiner

METHOD AND APPARATUS FOR CAMERA ACTUATOR DRIVER MODE CONTROL SYNCHRONIZED WITH IMAGING SENSOR FRAME

An embodiment of the invention relates to digital cameras that have a movable imaging lens that is actuated by a voice coil motor (VCM), and in particular to electronic circuits for driving the VCM. Other embodiments are also described.

BACKGROUND

Manufacturers of consumer electronic devices such as smartphones, tablet computers and other camera-containing devices (including dedicated personal cameras) currently use a voice coil motor (VCM) for actuating or moving an imaging lens in order to adjust a focus position of the camera optics (as part of an autofocus system) or for performing optical image stabilization. To achieve accurate positioning of the movable lens and also low electrical noise operation, the VCM is currently driven typically with a constant current linear drive circuit. It has been found that the linear drive circuit, however, is not sufficiently efficient from a power consumption viewpoint, such that in portable camera devices a switch mode or switching type (sometimes described as a pulse-width modulated (PWM) drive circuit) should be used to enhance power efficiency. Indeed, a PWM or switch mode drive circuit may be up to 50 percent more efficient than a linear drive circuit for a VCM.

SUMMARY

It has been discovered that the use of a switch mode drive circuit such as a PWM drive circuit for driving a VCM interferes with the solid state imaging sensor of a camera, causing objectionable imaging noise, which refers to noise artifacts that appear in the resulting digital picture, e.g. in the form of "row banding" which is a faint but noticeable horizontal line across the resulting digital picture.

In accordance with an embodiment of the invention, a camera apparatus has an electromechanical actuator (e.g., a VCM) that is coupled to move either a) an optical element, e.g. an imaging lens, which is directing light onto a pixel sensor array or b) the pixel sensory array itself, as part of the camera apparatus. For example, the actuator may be part of an auto focus system that moves an imaging lens, which is directing the light onto the pixel sensor array. The imaging sensor and its pixel sensor array produce a sequence of digital images (e.g., during a preview mode or during other still image capture or video capture modes of operation), where for each of the digital images, the pixel sensor array is reset in a reset/shutter phase of operation. The pixel sensor array is then allowed to convert light from a scene into pixel signals, during an integration phase of operation. Finally, the pixel signals are read out in digital form, during a readout phase of operation. While the camera apparatus is producing a sequence of digital images, the actuator is driven (e.g., for purposes of auto focus and/or optical or mechanical image stabilization) in both linear mode and in switch mode. The actuator is alternately driven in linear mode and in switch mode, during image capture, while changing between the two modes "dynamically" in the sense that the actuator is driven in a) linear mode while synchronized with a readout phase of operation of the imaging sensor, and b) switch mode while synchronized with the integration phase of operation of the imaging sensor. This yields a good compromise between the greater power efficiency of switch mode drive and the lower noise levels of linear drive, thereby producing resulting digital pictures that have no noticeable artifacts caused by the switch mode drive.

The readout phase of operation may be considered a time interval during which the camera is highly sensitive to the electrical noise produced by the circuitry that is driving the actuator. As a result, driving the actuator using a linear drive circuit during a part or all of the readout phase helps reduce the occurrence of objectionable noise artifacts, e.g. row banding, within the captured digital image that results from the readout operation.

To improve power efficiency, however, the actuator should sometimes be driven using a switch mode drive circuit, for example during a part of the reset/shutter phase of operation. While the integration phase may be considered a low sensitivity portion of the sensor frame structure, in terms of sensitivity to electrical noise from the actuator driver circuit, the reset/shutter phase may be considered a medium sensitivity interval in that there may be a higher chance that noise artifacts will appear in the digital image, if the reset/shutter phase overlaps with driving the actuator with the switch mode drive circuit.

To obtain even greater power efficiency, the actuator is driven using the switch mode drive circuit during both some of the integration phase and some of the reset/shutter phase. If the latter combination, however, results in too much noise artifact in the resulting digital images, then a compromise configuration may be to use linear drive during not just all of the readout phase but also during all of the reset/shutter phase, and limiting the switch mode drive to just part of the integration phase.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
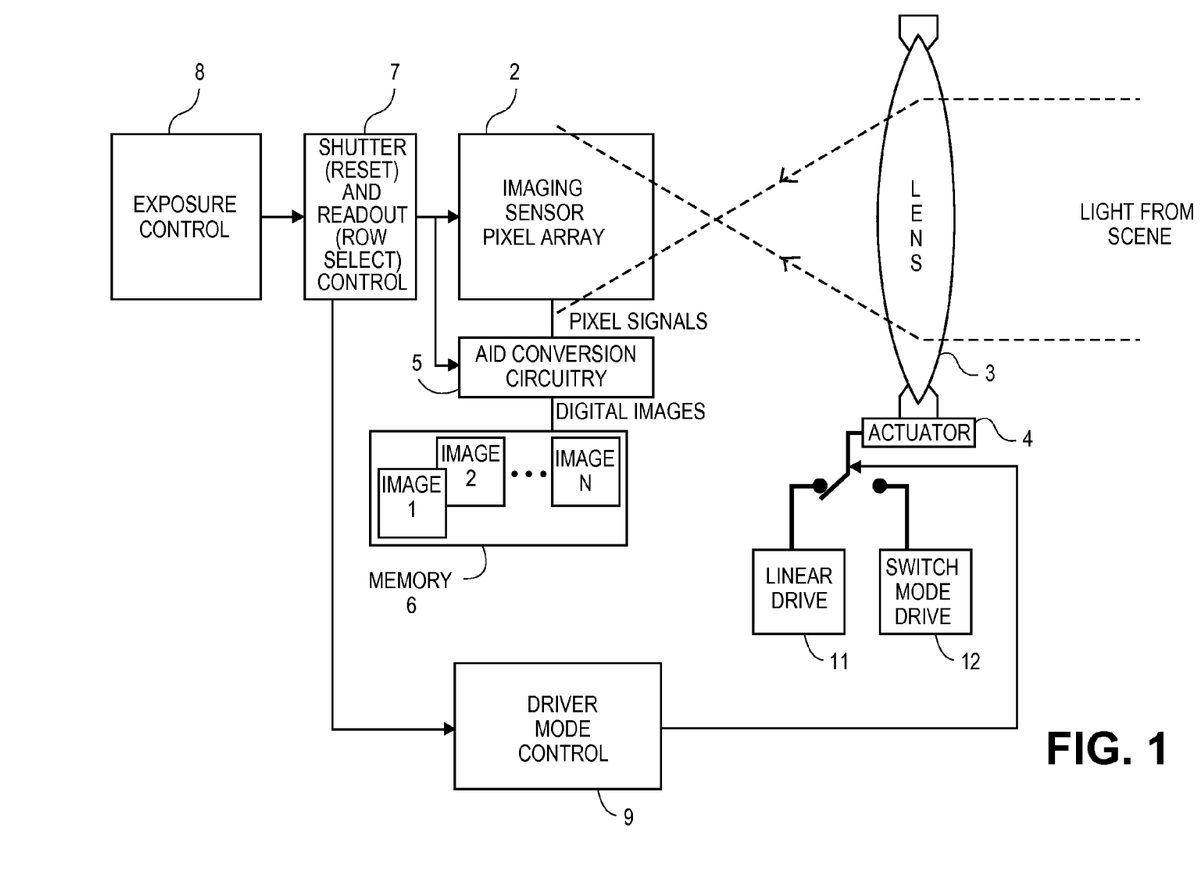
FIG. 1 is a block diagram of relevant components of a camera apparatus in accordance with an embodiment of the invention.

FIG. 1 is a block diagram of relevant components of a camera apparatus in accordance with an embodiment of the invention. An imaging sensor circuit may be composed of an imaging sensor pixel array 2 (also referred to as a focal plane array) and analog-to-digital (A/D) conversion circuitry 5 that serve to produce a sequence of captured digital images 1, 2, 3 . . . N of a scene. Light from the scene is directed by a lens 3, which may be part of an optical subsystem of the camera, onto the imaging sensor pixel array 2. An electro-mechanical actuator 4, e.g. a VCM, is coupled to move the lens 3. The movement may be designed to alter the size of the optical image produced on the imaging sensor pixel array 2 (variable zoom lens or variable magnification, for instance) or it may be used to primarily change the focal distance so that objects in the scene are captured sharply in the optical image formed on the pixel array 2 (auto focus lens). The actuator 4 may alternatively be connected to move another optical element or the pixel sensor array 2 itself, e.g. as part of an optical/mechanical image stabilizer. The actuator 4 is driven alternately, by a linear drive section 11 and by a switching type or switch mode drive section 12 both of which are part of the driver circuit. Although not shown, additional driver circuit sections may be included (so that the linear drive section 11 and the switch mode drive section 12 need not be the only driver circuits that are available in the camera apparatus to drive the actuator 4).

The camera apparatus has several control blocks. These include an exposure control 8, which in some cases may be higher layer camera driver software (e.g., at an operating system level) that is being executed by a processor in order to compute, using any suitable exposure calculation algorithm, the desired exposure time or integration time with which the imaging sensor circuit (including the pixel sensor array 2) is configured for capturing the digital images. Although not shown, the exposure control 8 has an input that may be coupled to several known sources, in order to receive parameters such as an ambient light measurement, zoom or magnification setting for the lens 3, manually selected (by the user) exposure time, and a frame capture rate. Based on a combination of desired and/or computed exposure settings, e.g. integration time and frame capture rate, the exposure control 8 configures a shutter and readout control circuit 7 that controls how much time the sensor pixel array 2 is exposed to, or allowed to integrate photo-generated charge from, light from the scene for each image that is captured in a given frame.

In one embodiment, the shutter and readout control circuit 7 may be part of an electronic shutter approach (that is used in many current cameras). The circuit 7 in that case may be in the form of programmable digital logic circuitry that is responsible for generating digital control signals with the correct timing, where such control signals are the applied to on-chip shutter control circuitry of the pixel array 2, in order to perform a shutter or photo detector reset operation followed by integration and readout.

While an electronic shutter approach is used in many cameras, where the exposure or integration time of the pixel array 2 is defined by electronic signal transfer from the pixels, or an electronic halting of integration by the pixels, an alternative is to use a mechanical shutter that physically blocks scene light from reaching the pixels. The control signals from the shutter and readout control 7 would in that case be designed to drive an electro-mechanical actuator that controls for example a leaf shutter or a focal plane shutter.

For readout, row select control signals may be asserted with the proper timing, in order to perform an orderly readout of the numerous pixels that constitute the pixel array 2. The pixel array 2 may be an array of photo detectors manufactured in accordance with, for example, complementary metal-oxide semiconductor (CMOS) photodiode techniques or charge-coupled device (CCD) technology, or other suitable imaging sensor pixel techniques. The pixel output signals are digitized by analog-to-digital (A/D) conversion circuitry 5 and then formatted or arranged and stored as captured digital images 1, 2, . . . N within a memory 6. While the A/D conversion circuitry 5 is shown as a separate box than the pixel array 2 in FIG. 1, this does not mean that the A/D conversion circuitry needs to be formed as a separate monolithic circuit. Rather, some or all of the A/D conversion circuitry 5 may be integrated into the pixel structures of the array 2.

Various embodiments of the invention are described that may exhibit improved immunity to the electrical noise that is inherently produced by a switch mode driver circuit that is driving the actuator 4 during successive image capture, by virtue of "cleaner" captured images that have less visible image noise artifacts (such as row banding). These are illustrated using several examples that focus on an image sensor frame structure (timing frame) that belongs to the electronic rolling shutter (ERS) category of image acquisition, where each digital image or picture in a frame is recorded not from a snapshot of the pixel array 2 at a single point in time but rather by scanning across the pixel array 2 either vertically or horizontally, over time. It should however be noted that the techniques described below for improving immunity to actuator driver circuit-induced image noise are also applicable to a global shutter image acquisition approach in which the entire pixel array 2 is "exposed" in the same time window, also referred to as a global shutter frame or global reset technique. For instance, many CCD types of pixel arrays utilize global shutters and may also benefit from the synchronization approaches described below.

Referring still to FIG. 1, control signals that may be derived from the shutter and readout control circuit 7 and if needed from the exposure control 8 are provided to driver mode control logic 9. The latter may include logic circuitry that produces a switch mode control signal, which is used to select, or reflect or indicate, whether linear drive section 11 or switch mode drive section 12 is being used for driving the actuator 4. When the switch mode control signal is asserted, the switch mode drive is being used for driving the actuator 4, and when de-asserted the linear mode drive is being used. In one embodiment, the switch mode control signal helps trigger the selection of switch mode drive section 12 and the linear mode drive section 11.

Linear drive section 11 may be any suitable circuitry that can, for example, provide a constant coil current, using a continuous current source (in the case where the actuator is a VCM). In contrast, the switch mode drive section 12 may include power switching circuitry that drives a constant coil current (averaged over time), using a switching regulator (e.g., a pulse-width modulation-based regulator). In another embodiment, the switch mode drive section 12 may have a combination of a switching circuit that switches an AC component of the coil current on top of a DC component, where the DC current is provided by a linear current source.

The linear drive section 11 and the switch mode drive section 12 are part of a driver circuit that is coupled to drive the actuator 4. This coupling is represented by a single pole double throw switch that takes one of two positions, namely one in which the actuator 4 is driven with the linear drive section 11, and another in which the actuator 4 is driven with the switch mode drive section 12. The decision as to which type of drive to use is made by the driver mode control circuit 9 which receives at its input control signals from the shutter and readout control logic 7 as described above, and optionally from the exposure control unit 8. In one embodiment, the driver mode control 9 produces the switch mode control signal that is used to configure the driver circuit (between linear drive section 11 and switch mode drive section 12).

The control signals that are input to the driver mode control 9 may define at least in part an image sensor frame (image sensor activity versus time) that repeats for each digital image that is being captured (as part of a given sequence of digital images being captured). The driver mode control 9 asserts its output control signal based on predetermined portions of the sensor frame. Viewed another way, the output control is synchronized with certain portions of the image sensor frame. When the control signal is asserted, the switch mode drive section 12 is selected to drive the actuator 4, and when the control signal is de-asserted, the linear drive section 11 is selected.

Figure 2:
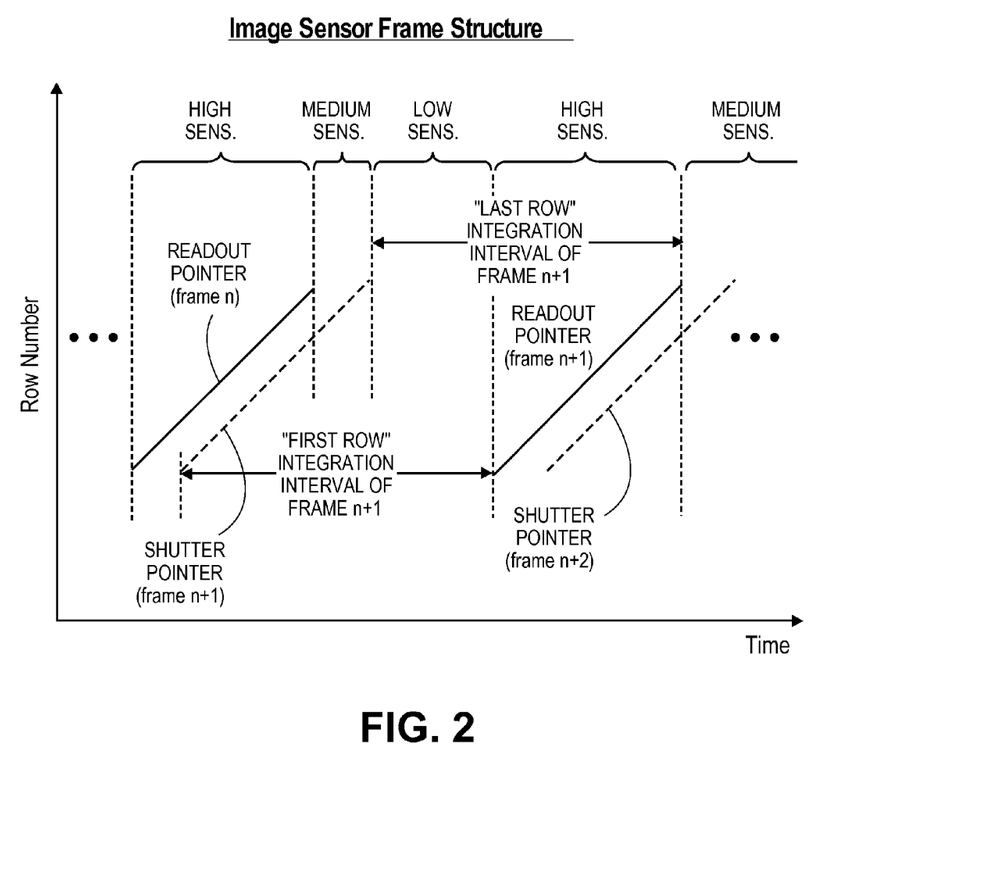
FIG. 2 illustrates an example image sensor frame structure versus time, for the particular case of an electronic rolling shutter (ERS) image sensor.

Turing now to FIG. 2, this is an example image sensor frame structure vs. time, for the particular case of an electronic rolling shutter (ERS) image sensor. The figure shows the different intervals that compose an image sensor frame structure in the context of ERS, however, the concepts below are also applicable to global shutter image sensors. The figure also shows how an image sensor frame can be defined in relation to certain activity in the pixel array 2. In this particular example, image sensor frame (n+1) is defined as beginning with its shutter pointer being asserted, thereby starting a process of resetting the pixels of the array 2 on a row-by-row basis. Note that a reference to "a row" here means "at least one row", because there may be more than one row that is controlled by a given control signal (e.g., a shutter/reset pointer). As provided by ERS, the rows thus sequentially reset by the sloped shutter pointer line, moving "up" the rows as shown. Note that, in contrast, a global shutter would be depicted by an essentially vertical shutter pointer line positioned at a given point in time, rather than one that is sloped.

After a row has been reset by the shutter pointer, the row is allowed to integrate or accumulate photo generated charge during an integration interval (by virtue of being exposed to light from the scene). A group of one or more rows may thus be allowed to integrate at the same time, while a subsequent group of one or more rows will start integrating at a slightly later time such that a spreading effect is achieved as shown in FIG. 2. In other words, the integration interval is actually spread across rows and over time. At the end of the integration interval, a readout pointer is asserted which signifies that the integration has ended for that group of one or more rows, and as such a readout operation may then proceed upon that group. The readout operation may include digitization of the individual output pixel signals by A/D conversion circuitry 5 (see FIG. 1). This conversion occurs during the relatively short time interval between the readout pointer being asserted and the shutter pointer being asserted for the next or subsequent frame. The image sensor frame structure then repeats for the next frame, to produce the next captured image.

FIG. 2 also contains labels that indicate the relative sensitivity of various phases (portions or intervals) of the respective sensor frame, to electrical noise produced by the actuator driver during those intervals. Note that this labeling is merely being used as a way to explain the reasoning behind the selection of linear drive vs. switch mode drive in the ERS embodiment of FIG. 3, and is not intended to limit the scope of the invention, particular in the context of global shutter. In the context of ERS, the integration phase (of a given frame, say frame n+1) may lie between the assertion of the "first row" shutter/reset pointer (of the given frame) and the assertion of the "last row" readout pointer (of the given frame). The shutter/reset phase may lie between the assertion of the "first row" shutter/reset pointer (of the given frame) and the assertion of the "last row" shutter/reset pointer (of the given frame). The readout phase (of the given frame) may lie between assertions of the first row readout pointer and the last row readout pointer (of the given frame). This definition of the frame structure of frame n+1 repeats for the previous frame n, and for the subsequent frame n+2.

The portion of the integration phase (for a given frame n+1) that does not overlap with the shutter and readout phases of the adjacent frames n and n+2, may be deemed a low sensitivity portion. In contrast, the entirety of the readout phase is deemed a high sensitivity portion (in view of the fact that readout often involves the relatively noise sensitive operation of A/D conversion). Lying between the high sensitivity readout phase of the previous frame n and the low sensitivity portion of the integration phase of frame n+1 is a medium sensitivity interval. This interval lies in the overlap between a tail portion of the shutter phase of frame n+1 and middle portion of the integration phase of frame n+1. The head portion of the shutter phase of frame n+1 however is deemed a high sensitivity portion, because it overlaps with the readout phase of the previous frame, frame n. In other words, because of the spreading effect of the ERS approach depicted here, some of the shutter phase is considered medium sensitivity while some of it is considered high sensitivity because the latter overlaps with a readout phase of a previous frame. Similarly, some of the integration phase is considered low sensitivity while some of it is considered high sensitivity because the latter overlaps with a readout phase of a subsequent frame.

Figure 3:
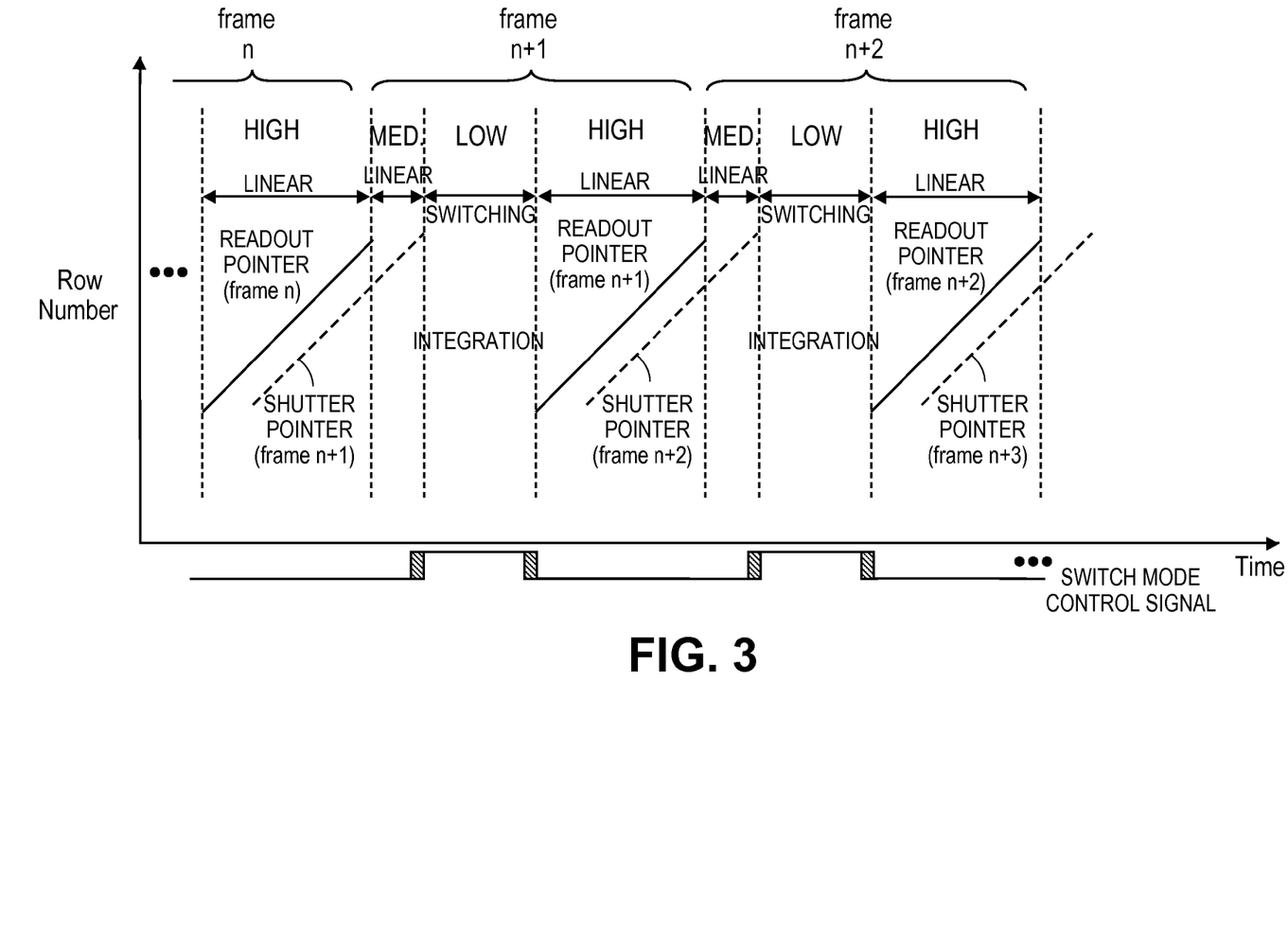
FIG. 3 illustrates the image sensor frame structure overlaid with a switch mode control signal and labels indicating the portions of each frame that are overlapping with the switching mode drive and the linear mode drive.
Figure 4:
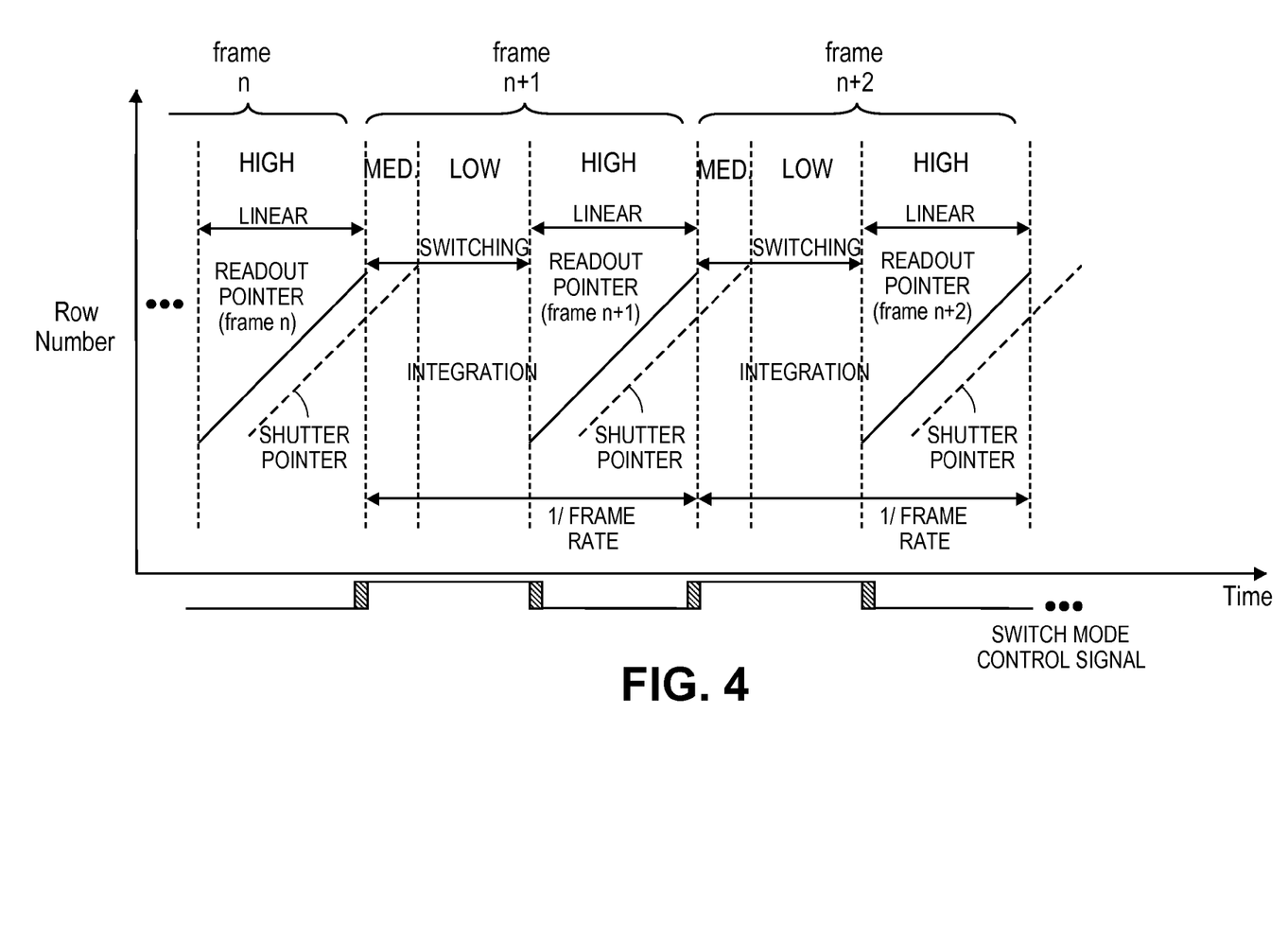
FIG. 4 illustrates another embodiment of the invention in which the interval during which the switching mode drive is used includes part of the integration phase and part of the reset/shutter phase for a given frame.

With the low, medium and high sensitivity regions of the image sensor frame structure having been defined to help explain the rationale behind the switching versus linear mode drives, FIGS. 3 and 4 illustrate two different embodiments of how to configure the driver circuit for linear mode vs. switch mode drive. In general, the switch mode control signal may be viewed as a control signal which when asserted signifies that the switch mode drive should be used, and when de-asserted signifies that the linear drive should be used. In the embodiment FIG. 3, the first predetermined portion of the respective sensor frame during which the control signal is asserted, such that the switch mode drive section 12 is selected, is part of the pixel signal integration phase during which one or more rows of the imaging sensor pixel array 2 are being allowed to "integrate" or accumulate photo generated charge (due to light from the scene forming an optical image on the sensor pixel array 2). This helps improve power efficiency of the camera function relative to when linear drive is used for the entire image sensor frame.

The efficiency improvement is particularly desirable when the camera apparatus is part of a portable multi function consumer electronic device, for example, a smart phone or a tablet computer. The camera apparatus may alternatively be part of other electronic devices, including as part of a dedicated camera device (rather than a multifunction device).

While the improvement in efficiency is important, use of the switching mode drive should be limited to regions of the image sensor frame structure that are deemed to have low sensitivity to the electrical noise that is produced by the switching mode drive section 12. In contrast, the linear drive section 11, while driving the actuator 4, produces significantly less electrical noise due to its inherent linear operating mode circuitry, albeit resulting in a less power efficient camera. The linear drive section 11 should be used during portions of the sensor frame that are expected to be highly sensitive to the electrical noise that would otherwise be produced by the switching mode drive. In one embodiment, the predetermined portion of the sensor frame during which the switch mode control signal is de-asserted (signifying that the linear drive section 11 be used) is at least a part of (and preferably all of) a readout phase in which pixel signals that have produced as a result of the integration phase are being transferred out of the array and/or are being digitized by A/D conversion circuitry 5. In one embodiment of the invention, some or all of the readout phase of a given frame is considered highly sensitive to electrical noise from the switch mode drive section 12, and as such that interval is assigned to the linear drive section 11. This can be seen in both embodiments of FIG. 3 and in FIG. 4. Accordingly, the switch mode control signal is de-asserted during the readout phase as shown in both figures.

Note that in a global shutter scenario, the entire integration phase may be deemed a low sensitivity interval, such that the switch mode control signal may be asserted during the entirety of the integration phase. The shutter/reset and readout phases in that case may be considered to be more sensitive than the integration phase, meaning that the switch mode control should be de-asserted during those phases.

Still referring first to FIG. 3, in this case, linear drive is used during the medium sensitivity region, which is a tail portion of the shutter/reset phase of frame n+1, while switching drive is used during the middle portion of the integration phase. The readout phase is, in this case, in its entirety reserved for the linear drive section. This combination of linear and switching drive selections is repeated for subsequent and prior frames of a given sequence of captured images.

It should be noted that due to the electronic rolling shutter approach used here, while each frame has its respective integration interval that does not overlap with another frame, this is not the case with the shutter and the readout phases. Indeed, for fame n+1, its shutter phase overlaps substantially with part of the readout phase of frame n and n+1, while the readout phase of frame n+1 overlaps substantially with the shutter phase of frame n+2.

What FIG. 3 also shows is that during a part of every respective readout phase for the sequence of digital images corresponding to frames n, n+1, n+2, the actuator 4 is driven using a linear drive circuit. In addition, during a part of every respective pixel integration phase for the sequence of frames, the actuator 4 is driven using a switch mode drive circuit. In addition, however, FIG. 3 shows the embodiment where during a part of every respective shutter/reset phase for the sequence of digital images, the actuator 4 is driven using the linear drive circuit, that is, during the medium sensitivity interval at the beginning of each frame (as the frame is defined in this instance).

It should be noted that while each frame is defined in FIG. 3 as starting with the last row readout of the previous frame and ending with its own last row readout, there are other ways of defining the boundaries of each frame. For example, frame n+1 can alternatively be defined as starting with its shutter pointer n+1 at the first row and ending with the its readout pointer n+1 at the last row; frame n+2 would be defined similarly, thereby building into the definition an overlap (with respect to time) with the subsequent frame. In contrast, the embodiment of FIG. 3 defines the frames in such a way that there is no overlap between adjacent frames. Regardless of the manner in which the boundaries of a frame are defined, however, the low, medium and high sensitivity intervals may remain the same as shown in FIG. 3, such that the linear drive vs. switch mode drive assignment for each of the low, medium and high intervals remains unchanged in that case. For example, if frame n+1 were defined to begin with the shutter pointer n+1 at the first row, then part of its shutter phase would be a high sensitivity interval and as such would be assigned to the linear drive section 11, thereby resulting in the entire shutter/reset phase of each frame being assigned to linear drive.

In contrast to the embodiment of FIG. 3, FIG. 4 illustrates another embodiment in which the use of the switch mode drive is extended, for improved efficiency (yet without a significant increase in image noise artifacts). Here, the interval during which the switch mode drive is used includes not just part of the integration phase (similar to FIG. 3) but also at least part of the reset/shutter phase, for each given frame. As a result, the switch mode control signal remains asserted longer, in this case extending to the medium sensitivity region that is the tail end of the shutter/reset phase (of the respective sensor frame). In other words, during a part of every respective shutter/reset phase for the sequence of digital images shown, the actuator is driven using the switch mode drive circuit 12.

The following additional statements of invention are made. In one embodiment, a method for digital image capture of a scene comprises: producing a sequence of digital images, using an imaging sensor circuit having a pixel sensor array, by, for each of the images, resetting the pixel sensor array in a reset/shutter phase of operation, allowing the pixel sensor array to convert light from a scene into pixel signals during an integration phase of operation, and reading out the pixel signals in digital form during a readout phase of operation; an electro-mechanical actuator is being driven in linear mode and in switch mode, while producing the sequence of digital images, wherein the actuator is coupled to move a) an imaging lens which is directing the light onto the pixel sensor array or b) the pixel sensor array; the driving of the actuator in linear mode is synchronized with the readout phase of operation (e.g., the actuator is driven in linear mode during all of the readout phase of operation), and the driving of the actuator in switch mode is synchronized with the integration phase of operation wherein the actuator is driven in switch mode during a part, not all, of the integration phase of operation. Examples of such synchronization include the following ERS embodiments.

First, referring to FIG. 3, the actuator may be driven in linear mode during a part, not all, of the readout phase of operation (where a readout pointer for frame n+1 is being updated to scan (e.g., sequentially) the rows of the pixel array 2. In one embodiment, for even better noise reduction, the actuator is driven in linear mode during all of the readout phase of operation. In another embodiment, also depicted in FIG. 3, in the same process of producing the sequence of digital images, the actuator is also driven in linear mode in synch with the reset/shutter phase of operation, i.e. during a part of the reset/shutter phase wherein the shutter/reset point is being updated to scan the final group of rows that are being reset. In yet another embodiment, the actuator can be driven in linear mode in synch with the reset/shutter phase, during all of the reset/shutter phase of operation, i.e. while the shutter/reset pointer is updated and scans the entire pixel array 2.

In another embodiment, referring to FIG. 4 now, the actuator is also driven in switch mode in synch with the reset/shutter phase of operation, e.g. starting just after the last row has been scanned by the readout pointer and continuing past the last row being scanned by the shutter pointer of the next frame.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 shows the actuator 4 connected to move the lens 3, e.g. as part of an auto focus system, the techniques described above are also applicable to actuators that move the sensor pixel array 2, e.g. as part of an optical/mechanical image stabilization system. The description is thus to be regarded as illustrative instead of limiting.

What is claimed is:

1. A camera apparatus comprising:
an imaging sensor circuit to produce a sequence of images, each image being produced during a respective sensor frame;
a driver mode control circuit coupled to the sensor circuit, to produce a control signal that is asserted during a first predetermined portion of the respective sensor frame and is not asserted during a second predetermined portion of the respective sensor frame;
a lens to form a light image on a sensor pixel array of the imaging sensor circuit;
an electro-mechanical actuator coupled to move the lens or the sensor pixel array; and
a driver circuit coupled to drive the actuator, the driver circuit having a linear drive section and a switch mode drive section, wherein the driver circuit is configured to drive the actuator a) with the switch mode drive section and not the linear drive section when the control signal is asserted, and b) with the linear drive section and not the switch mode drive section when the control signal is de-asserted.

2. The apparatus of claim 1 wherein the first predetermined portion of the respective sensor frame is part of a pixel signal integration phase.

3. The apparatus of claim 2 wherein the second predetermined portion of the respective sensor frame, during which the linear drive section is driving the actuator, is part of a readout phase.

4. The apparatus of claim 3 wherein the control signal is not asserted during a third predetermined portion of the respective sensor frame that is part of a shutter/reset phase.

5. The apparatus of claim 3 wherein the second predetermined portion of the respective sensor frame is all of the readout phase.

6. The apparatus of claim 1 wherein the actuator is a voice coil motor and the linear drive section drives a constant coil current using a continuous current source.

7. The apparatus of claim 6 wherein the actuator is a voice coil motor and the switch mode drive section drives a constant coil current using a switching regulator.

8. A method for digital image capture of a scene, comprising:
producing digital image using an imaging sensor circuit, wherein the digital image was a result of light capture by the imaging sensor circuit during a pixel integration phase followed by analog to digital conversion during a readout phase; and
driving an electro-mechanical actuator while producing the digital image, wherein the actuator is coupled to move an imaging lens which is focusing light onto a sensor pixel array portion of the imaging sensor circuit or is coupled to move the sensor pixel array portion,
wherein during a part of the readout phase the actuator is driven using a linear drive circuit, and wherein during a part of the pixel integration phase the actuator is driven using a switch mode drive circuit and not the linear drive circuit.

9. The method of claim 8 wherein the digital image was a result of a shutter/reset phase prior to the pixel integration phase,
and wherein during a part of the shutter/reset phase the actuator is driven using the linear drive circuit and not the switch mode drive circuit.

10. The method of claim 9 wherein the actuator is driven using the linear drive circuit and not the switch mode drive circuit during all of the readout phase.

11. The method of claim 8 wherein the digital image was a result of a shutter/reset phase prior to the pixel integration phase,
and wherein during a part of the shutter/reset phase the actuator is driven using the switch mode drive circuit and not the linear drive circuit.

12. The method of claim 11 wherein the actuator is driven using the linear drive circuit and not the switch mode drive circuit during all of the readout phase.

13. The method of claim 8 wherein the actuator is driven using the linear drive circuit and not the switch mode drive circuit during all of the readout phase.

14. A method for digital image capture of a scene, comprising:
producing a sequence of digital images, using an imaging sensor circuit having a pixel sensor array, by
a) for each of the images, resetting the pixel sensor array in a reset/shutter phase of operation,
b) allowing the pixel sensor array to convert light from a scene into pixel signals during an integration phase of operation, and
c) reading out the pixel signals in digital form during a readout phase of operation; and
driving an electro-mechanical actuator by a linear drive circuit and not a switch mode drive circuit, and driving the actuator by the switch mode drive circuit and not the linear drive circuit, while producing the sequence of digital images, the actuator being coupled to move a) an imaging lens which is directing the light onto the pixel sensor array or b) the pixel sensor array,
wherein driving the actuator by the linear drive circuit and not the switch mode drive circuit is synchronized with the readout phase of operation, and driving the actuator by the switch mode drive circuit and not the linear drive circuit is synchronized with the integration phase of operation.

15. The method of claim 14 wherein the actuator is driven by the linear drive circuit and not the switch mode drive circuit during a part, not all, of the readout phase of operation.

16. The method of claim 14 wherein the actuator is driven in by the linear drive circuit and not the switch mode drive circuit during all of the readout phase of operation.

17. The method of claim 14 further comprising driving the actuator by the linear drive circuit and not the switch mode drive circuit in synch with the reset/shutter phase of operation.

18. The method of claim 17 wherein the actuator is driven by the linear drive circuit and not the switch mode drive circuit in synch with the reset/shutter phase, during a part, not all, of the reset/shutter phase of operation.

19. The method of claim 18 wherein the actuator is driven by the linear drive circuit and not the switch mode drive circuit, during all of the reset/shutter phase of operation.

20. The method of claim 18 wherein the actuator is driven by the switch mode drive circuit and not the linear drive circuit during a part, not all, of the reset/shutter phase of operation.

21. The method of claim 20 wherein the actuator is driven by the linear drive circuit and not the switch mode drive circuit during all of the readout phase of operation.

22. The method of claim 14 wherein the actuator is driven by the switch mode drive circuit and not the linear drive circuit during a part, not all, of the integration phase of operation.

\* \* \* \* \*